(12) United States Patent
Kuntze et al.

(10) Patent No.: US 12,140,173 B2
(45) Date of Patent: Nov. 12, 2024

(54) RIVET NUT WITH COMPRESSION LIMITER SHOULDER

(71) Applicants: Christopher J. Kuntze, Goodrich, MI (US); Magna Exteriors Inc., Concord (CA)

(72) Inventors: Christopher J. Kuntze, Goodrich, MI (US); Heiner Salzmann, Metamora, MI (US); Jan Bárta, Liberec (CZ)

(73) Assignee: Magna Exteriors Inc., Aurora (CA)

( * ) Notice: Subject to any disclaimer, the term of this patent is extended or adjusted under 35 U.S.C. 154(b) by 258 days.

(21) Appl. No.: 17/635,882

(22) PCT Filed: Aug. 14, 2020

(86) PCT No.: PCT/US2020/046446
§ 371 (c)(1),
(2) Date: Feb. 16, 2022

(87) PCT Pub. No.: WO2021/034690
PCT Pub. Date: Feb. 25, 2021

(65) Prior Publication Data
US 2022/0290712 A1 Sep. 15, 2022

Related U.S. Application Data

(60) Provisional application No. 62/888,193, filed on Aug. 16, 2019.

(51) Int. Cl.
*F16B 37/06* (2006.01)
(52) U.S. Cl.
CPC ............ *F16B 37/067* (2013.01); *F16B 37/06* (2013.01)

(58) Field of Classification Search
CPC ........ F16B 5/04; F16B 13/061; F16B 13/122; F16B 13/124; F16B 13/128; F16B 37/067; F16B 37/06
USPC ......... 411/34, 37–38, 44, 55, 80.6, 500–501, 411/504–505, 508
See application file for complete search history.

(56) References Cited

U.S. PATENT DOCUMENTS

| 4,716,893 | A | * | 1/1988 | Fischer | F16B 13/124 606/66 |
| 5,248,231 | A | * | 9/1993 | Denham | F16B 19/1054 411/69 |
| 5,252,013 | A | * | 10/1993 | Browne | F16B 19/1054 411/70 |
| 8,226,339 | B2 | * | 7/2012 | Neri | F16B 37/067 411/181 |

(Continued)

FOREIGN PATENT DOCUMENTS

| FR | 2918422 A3 | 1/2009 |
| FR | 2979401 A1 | 3/2013 |

(Continued)

OTHER PUBLICATIONS

International Search Report for PCT/US2020/046446 dated Nov. 19, 2020, 1-page.

*Primary Examiner* — Roberta S Delisle
(74) *Attorney, Agent, or Firm* — Warn Partners, P.C.

(57) ABSTRACT

The rivet nut (22) includes: the threaded attachment to replace the weld nut, the collar to spread the load interface to plastic panel (14) and to the attached component, room for a sleeve type compression limiter (24), or a collar that would be an integrated compression limiter.

24 Claims, 7 Drawing Sheets

(56) References Cited

U.S. PATENT DOCUMENTS

| | | | | |
|---|---|---|---|---|
| 8,292,560 | B2* | 10/2012 | McGee | F16B 19/1072 |
| | | | | 411/42 |
| 10,316,883 | B2* | 6/2019 | Makino | F16B 37/067 |
| 2005/0031433 | A1* | 2/2005 | Neri | B25B 27/0014 |
| | | | | 411/180 |
| 2005/0053449 | A1* | 3/2005 | Grubert | F16B 5/025 |
| | | | | 411/546 |
| 2005/0180841 | A1* | 8/2005 | Cao | F16B 37/067 |
| | | | | 411/501 |
| 2006/0291974 | A1* | 12/2006 | McGee | B25B 27/0014 |
| | | | | 411/171 |
| 2010/0101177 | A1* | 4/2010 | McGee | F16B 19/1072 |
| | | | | 52/698 |
| 2016/0010679 | A1* | 1/2016 | Makino | F16B 37/067 |
| | | | | 411/34 |

FOREIGN PATENT DOCUMENTS

| | | |
|---|---|---|
| GB | 2240603 A | 8/1991 |
| JP | S59116618 U | 8/1984 |

* cited by examiner

US 12,140,173 B2

RIVET NUT WITH COMPRESSION LIMITER SHOULDER

CROSS-REFERENCE TO RELATED APPLICATIONS

This application is a National Stage of PCT International Application No. PCT/US2020/046446, filed Aug. 14, 2020 and claims benefit of U.S. Provisional Patent Application No. 62/888,193 filed Aug. 16, 2019. The disclosures of the above are incorporated herein by reference.

FIELD OF THE INVENTION

The present invention relates to a rivet nut with compression limiter shoulder.

BACKGROUND OF THE INVENTION

In the art of providing fasteners for fastening panels together and providing hard points for fastening of hinges, ball joints or other functional accessories, it is general knowledge that fastener joints relax and lose clamp force, and is a bigger concern when utilizing soft materials such as plastics.

At high load critical fastener joints a metallic to metallic contact is needed to avoid joint relaxation concerns. Thus, extra components are often utilized such as metallic compression limiters.

Compression Limiters allow the metallic interface, but they drive extra cost, and create assembly concerns. Therefore, it has been a goal in the art to achieve a metallic joint interface without multiple extra parts that drives extra complexity and extra cost.

Combining the metallic interface and part of the fastener into one component, and allowing assembly at the end of the process allows for a more efficient product with fewer components, lower tolerance stack up, better joint integrity, easier assembly, less scrap, and lower quality or warranty concerns.

Therefore, it is desired to provide an improved lower cost rivet nut which provides a secure connection in apart including a plastic panel or overmolded panel component which is robust and does not over stress the plastic panel.

SUMMARY OF THE INVENTION

The rivet nut includes: the threaded attachment to replace the weld nut, the collar to spread the load interface to plastic panel and to the attached component. The compression limiter is a sleeve type compression limiter, or a collar that would be an integrated compression limiter in the design. The compression limiter protects a predetermined plastic layer of a part when fastening the rivet nut in position and while a hinge or other functional member is attached to the rivet nut such as may be found in attaching a hinge or ball joint connector to a liftgate for instance. Combining the metallic interface and part of the fastener into one component, and allowing assembly at the end of the process allows for a more efficient product with fewer components, lower tolerance stack up, better joint integrity, easier assembly, less scrap, and lower quality or warranty concerns.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
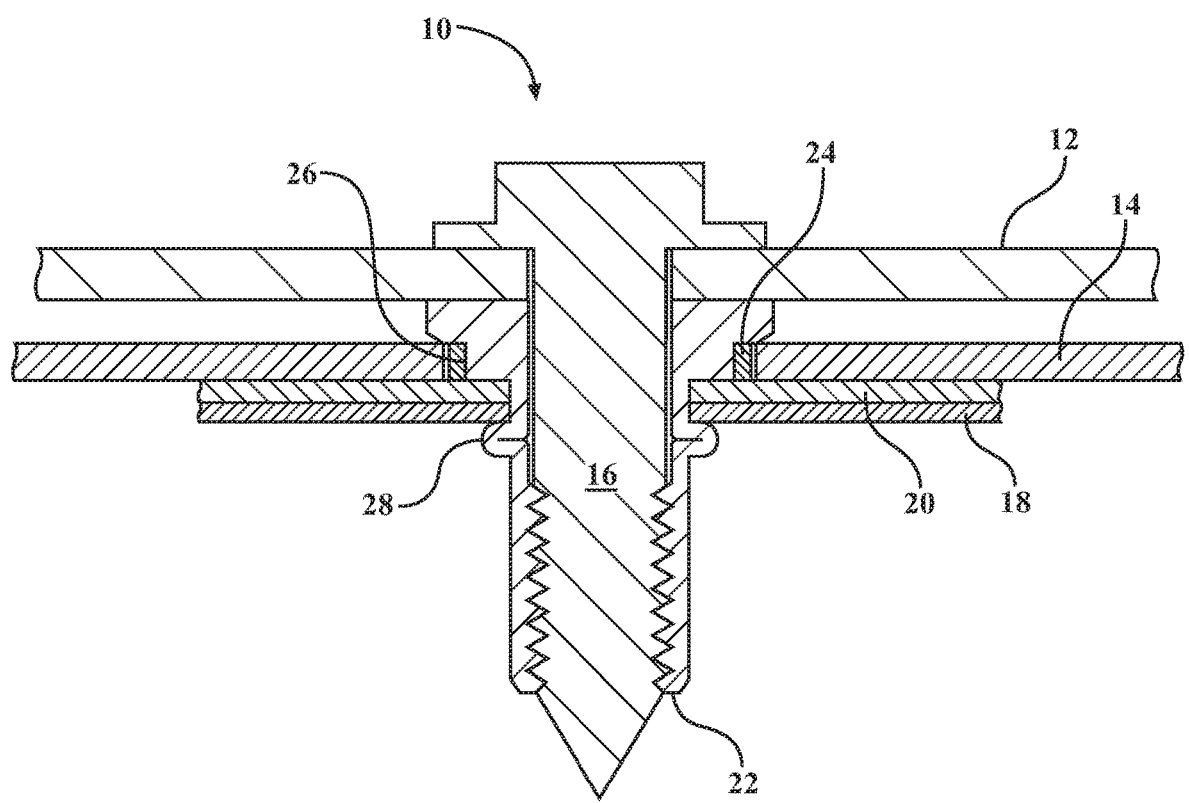
FIG. 1 is a sectional view showing two embodiments of a rivet nut with compression limiter for plastic panels in accordance with the teachings of the present invention.

Referring now to the figures, a rivet nut assembly generally shown at 10 is provided which is advantageous for attaching a metal member such as a hinge or other member which is typically metal 12 onto a plastic panel 14 such as a liftgate for an SUV vehicle by way of a threaded fastener 16. As shown in FIG. 1, the inner plastic panel is positioned next to a metal support or panel 18 which may be overmolded or have a polymer or other coating 20.

Figure 8:
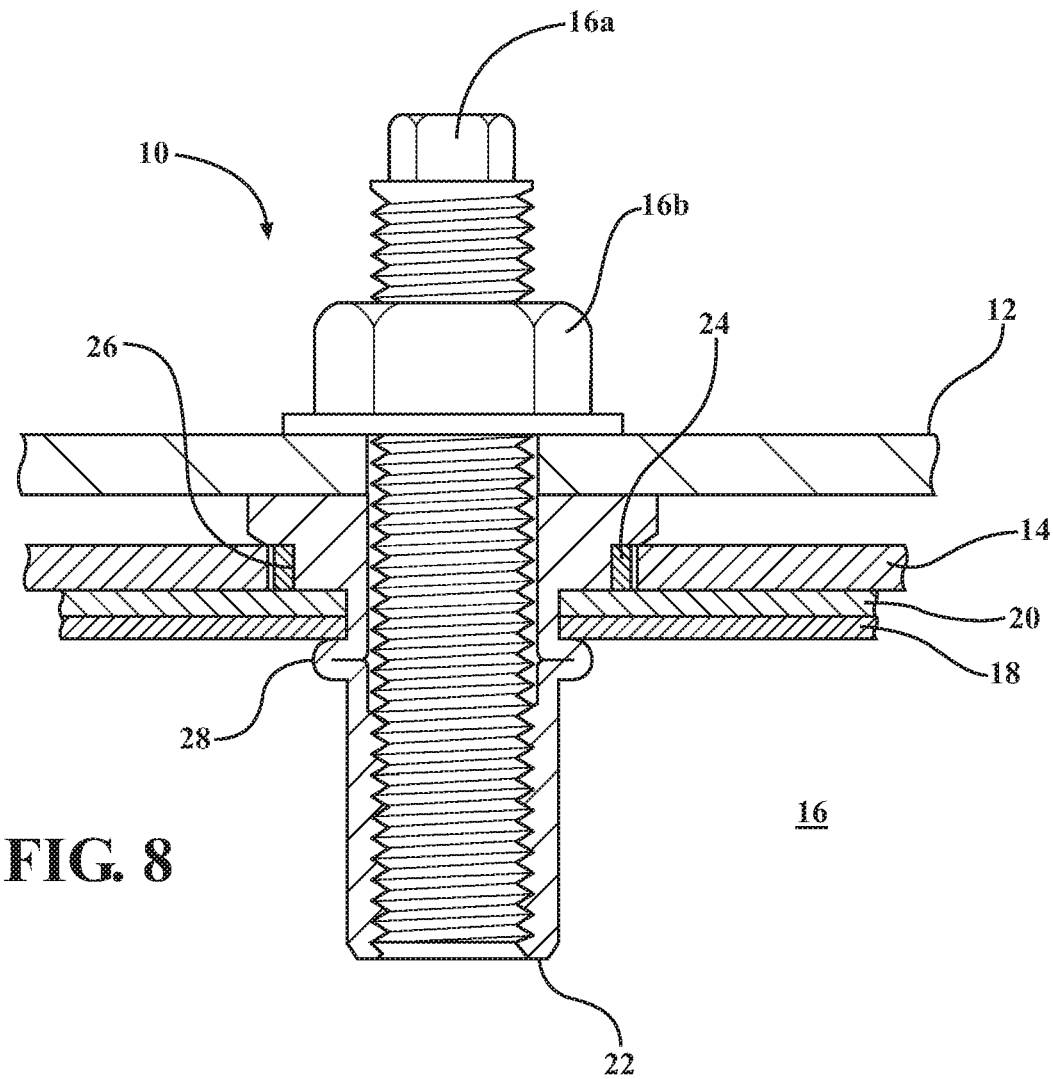
FIG. 8 is a sectional view similar to FIG. 1 showing a rivet stud embodiment of the invention.

The rivet nut portion 22 as referred to herein is used to refer to a rivet nut or a rivet stud. Thus while a bolt fastener 16 is shown in the drawings generally, As shown in FIG. 8 a rivet stud embodiment would replace the bolt fastener16 with a threaded stud 16a such that a nut 16b could be threaded on to the stud for securing a hinge or other attachment if required in a particular application. The riven nut portion 22 is shown with a protective collar 24 on the right hand side (which in one embodiment is a cylinder) or an integrated shoulder 26 shown on the left hand side, which in another embodiment is also circular. The drawing shows these two different types of compression limiters which are circular in one illustrative drawing. They are alternatives for providing a compression limiter in the rivet nut for protecting the plastic panel 14. As will be appreciated by those skilled in the art the depth of the collar or shoulder portion is about the same depth as the predetermined thickness of the plastic panel layer 14. Also, the tolerances in the openings and parts are kept very close in the assemblies of the present invention to provide proper operation and mechanical securing at the connection.

Figure 2:
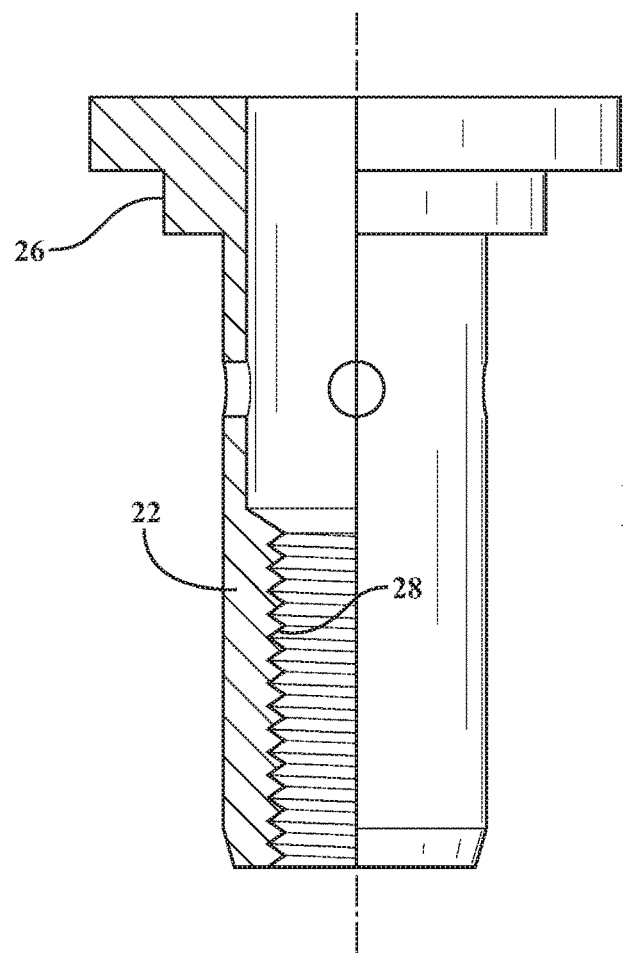
FIG. 2 is a sectional view of a rivet nut female member in accordance with the teachings of the present invention.
Figure 2A:
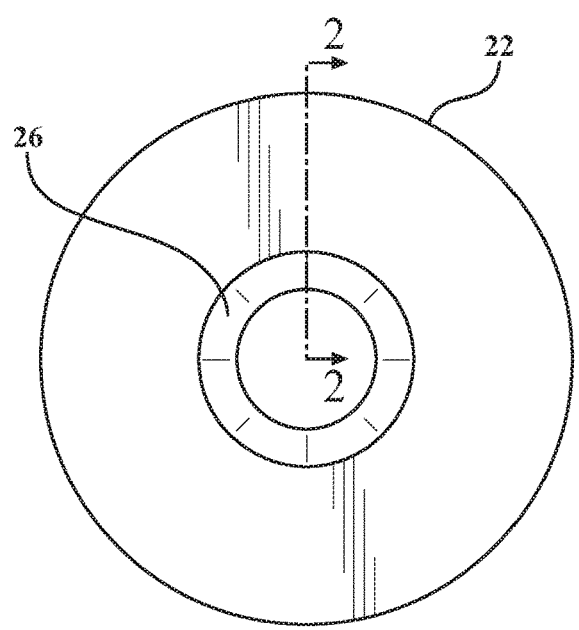
FIG. 2a is a bottom view of the rivet nut of the present invention.

A rivet nut 22 with a shoulder compression limiter 26 is shown prior to compression in FIG. 2. The rivet nut internally threaded portion 28 is shown in compressed in FIG. 2 and in clamping compression in FIG. 1.

Figure 3:
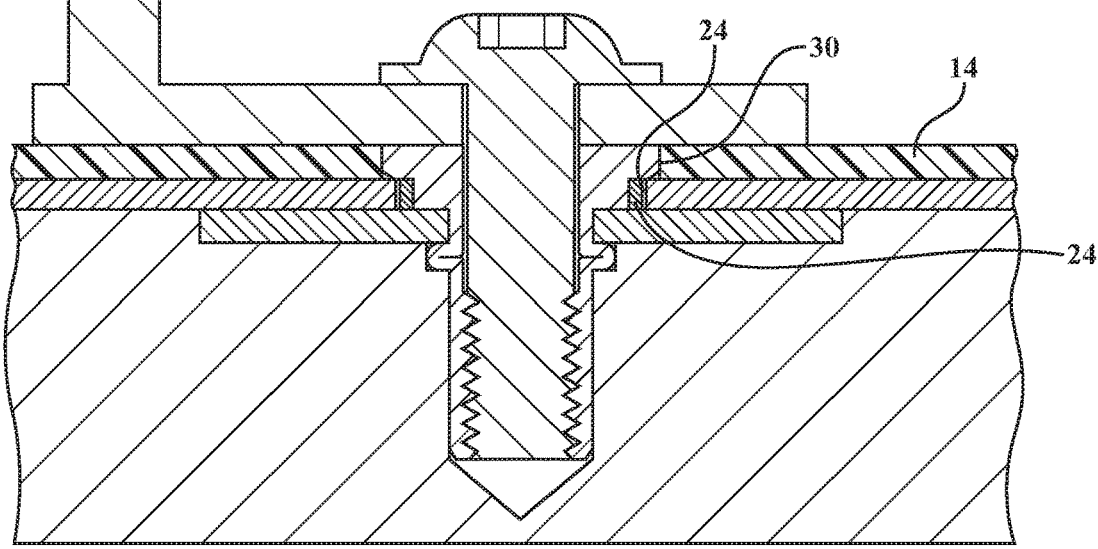
FIG. 3 is a sectional view showing the rivet nut with a compression limiting collar used in a plastic panel and lifting ball for a ball socket connection assembly of the present invention.

Generally, a body panel assembly such as in a liftgate will include a plastic structural panel such as a filled thermoplastic or the like to which it is necessary to attach a component such as a hinge 12. Referring now to FIG. 3, there is provided a compression limiter 24 for protecting an overmolded skin with a collar type compression limiter 24. The outer circumferential lip 30 of the rivet nut also acts as a compression limiter for the plastic part.

Figure 4:
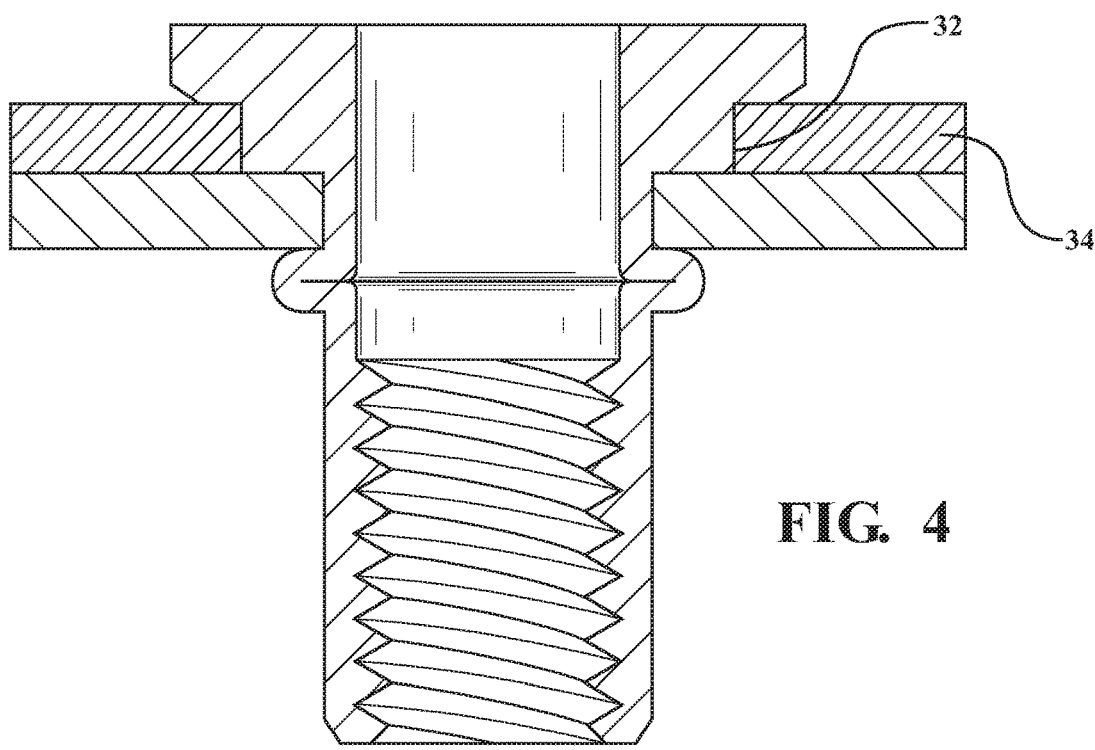
FIG. 4 is a section view showing the rivet nut in compression holding a plastic panel and a metal panel together.

FIG. 4 shows a stepped type integrally formed compression limiter portion 32 which protects plastic layer 34.

Figure 5:
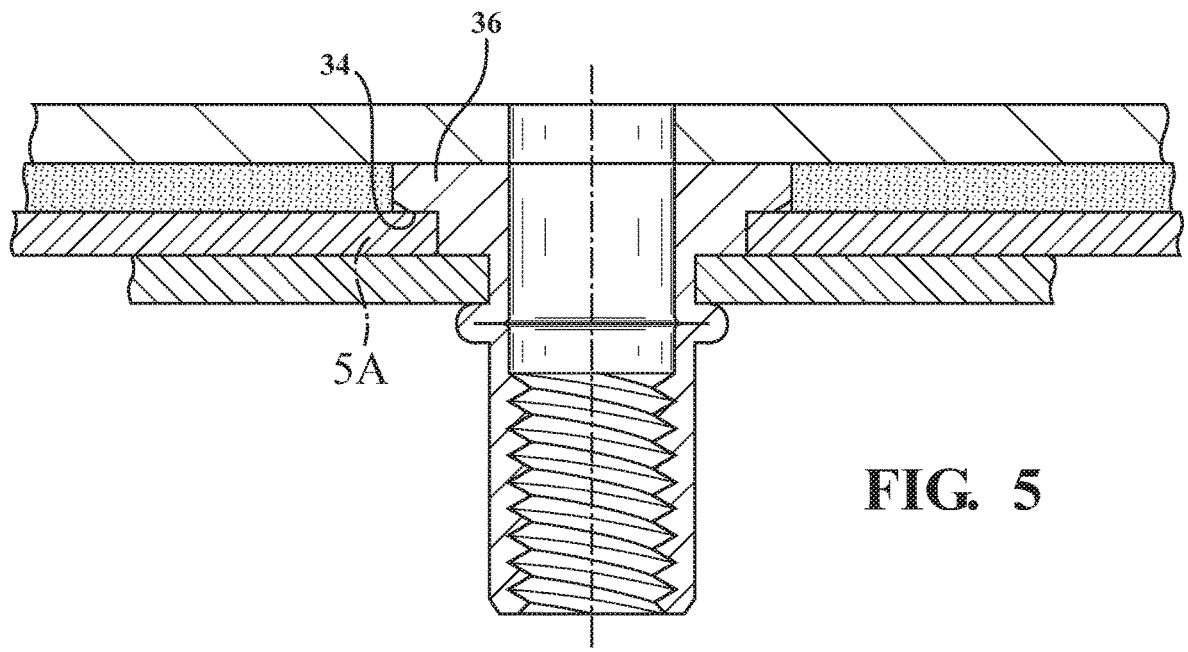
FIG. 5 is a sectional view of an alternate embodiment of the present invention.

FIG. 5 shows the stepped shoulder integrally formed compression limiter 32 with an optional texture As an optional embodiment a texture can be applied either to the inner face 34 and/or to the plastic part or its skin 36. The texture applied is preferably knurling, ribbing, patterned or raised areas at the interference area between the rivet nut and the plastic layer. This provides additional mechanical securement of the joint which may be desirable in some joints.

Figure 5A:
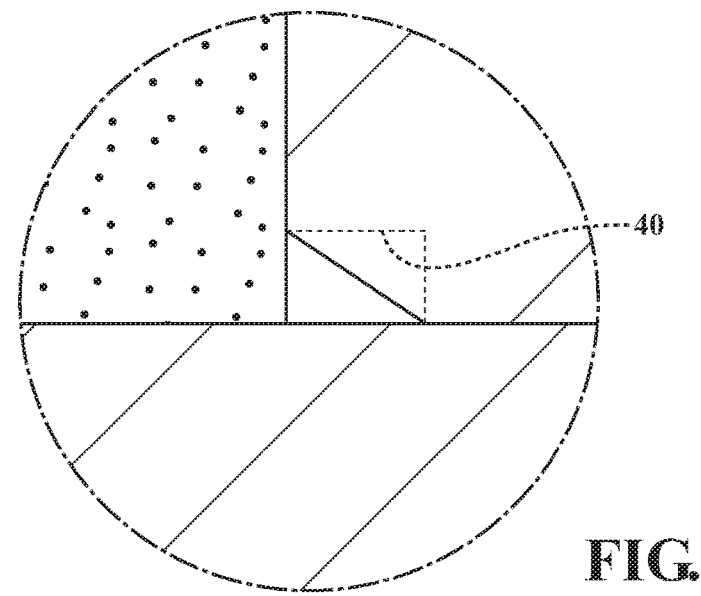
FIG. 5a is an alternate view of a compression limiter having a sloped surface for contacting a plastic panel.

FIG. 5a shows the shoulder portion 38 which mechanically engages a portion of a plastic panel 40 for providing an enhanced tightened fit if desired.

Figure 6:
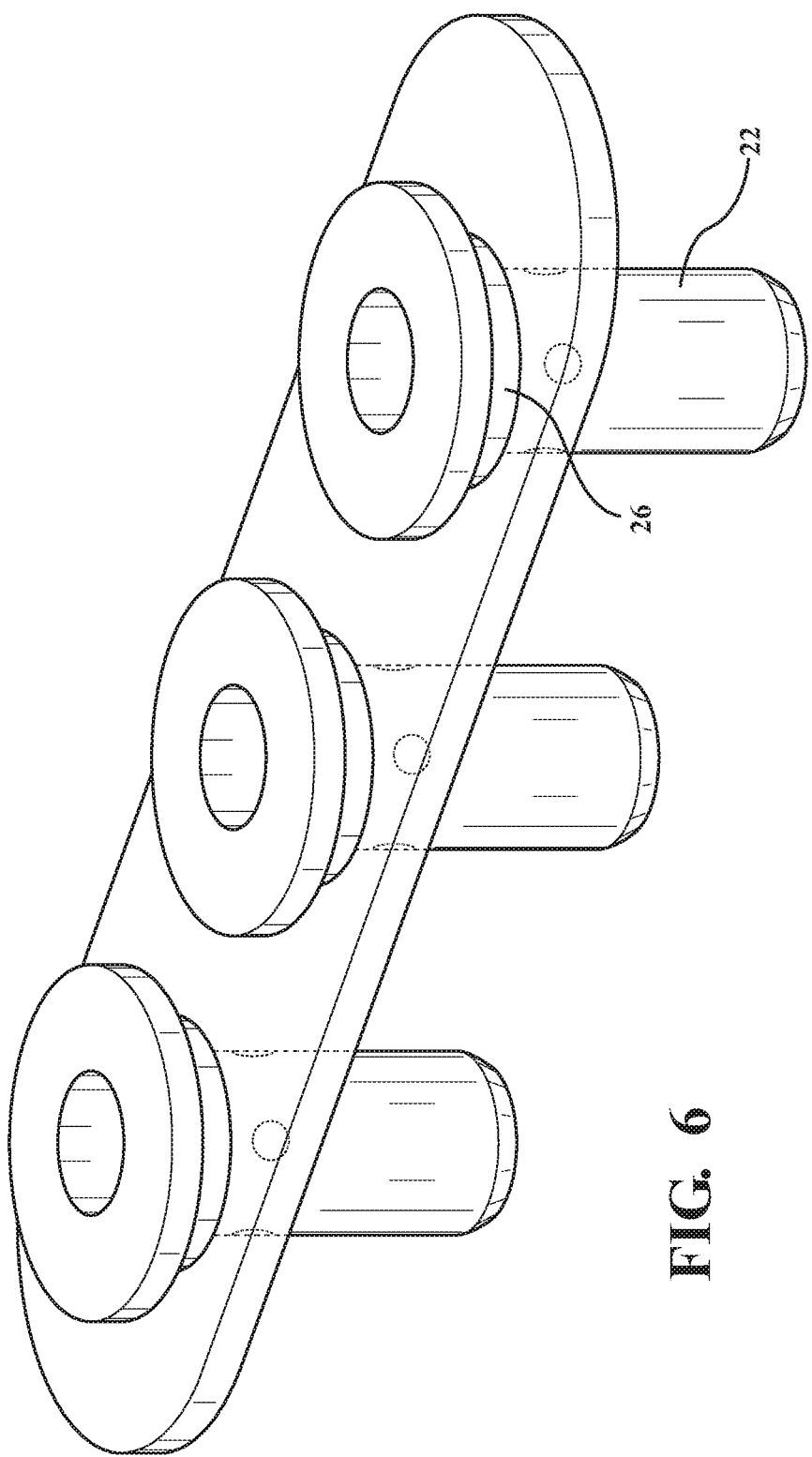
FIG. 6 is a perspective view of a series of rivet nuts made in accordance with the teachings of the present invention attached to a steel panel without a plastic layer.
Figure 7:
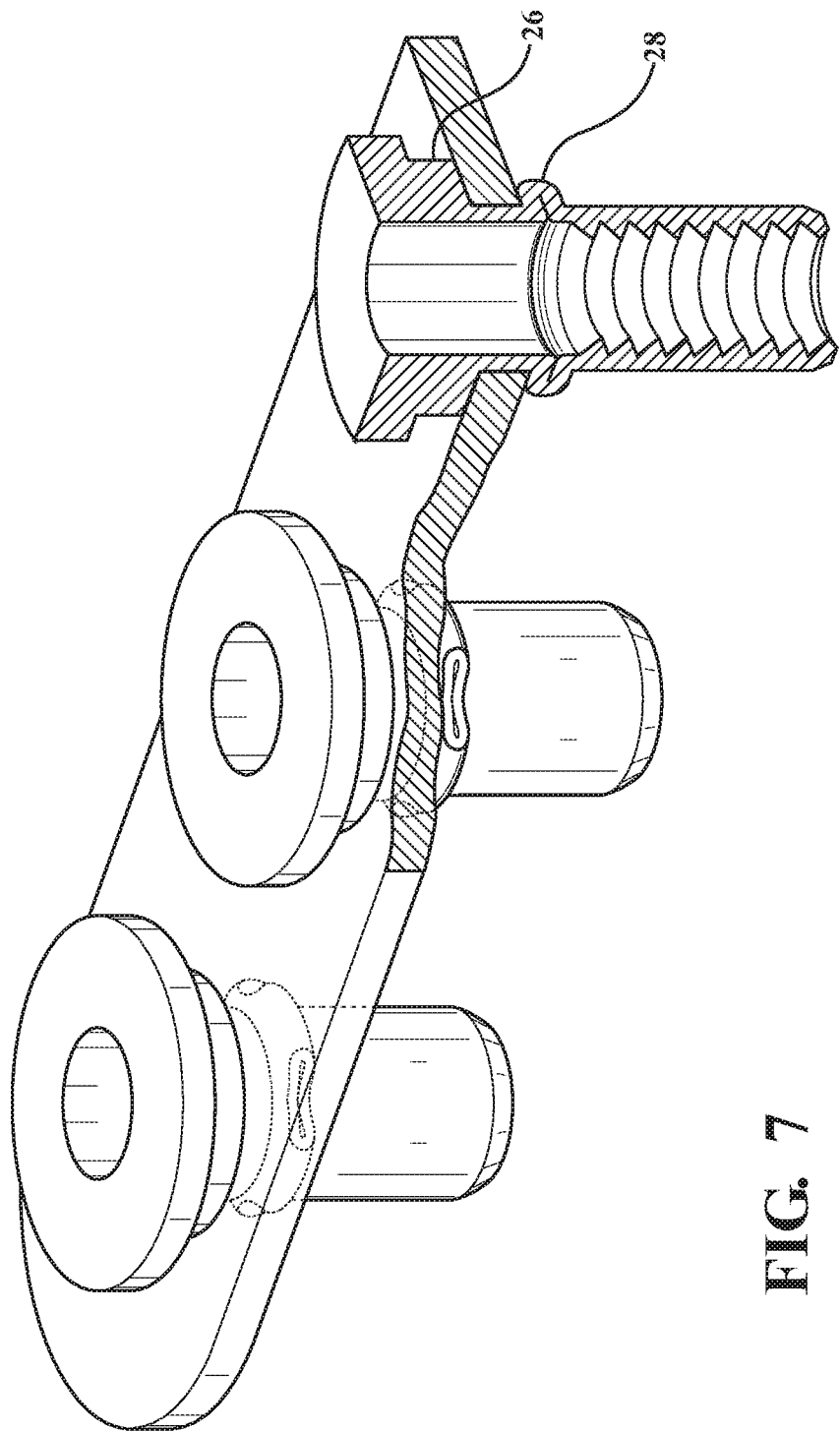
FIG. 7 is a sectional view of one of the rivet nuts of FIG. 6.

Referring to FIGS. 6 and 7 there are shown rivet nuts 22 with integral compression limiters 24 attached to a metal panel at the threaded portion 28 as examples.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A rivet nut assembly for attachment of a metal part to a polymer panel comprising: a threaded attachment portion, a compression limiter portion which provides a spacer for protecting the integrity of a first polymer panel while spreading the load interface to the plastic panel and a compression portion which provides full compressive attachment to the attached metal part component, and a through fastener for securing the assembly together thereby attaching the metal part to the polymer panel.

2. The rivet nut of claim 1 wherein the compression limiter is a collar.

3. The rivet nut of claim 1 where in the compression limiter is a sleeve.

4. The rivet nut of claim 1 wherein the compression limiter is integrated with the collar.

5. The rivet nut of claim 1 wherein the compression limiter has a radially extending circumferential head portion attached to a cylinder shaped body portion.

6. The rivet nut of claim 1 wherein the axial dimension of the compression limiter is about the thickness of a part layer.

7. The rivet nut of claim 6 wherein the part layer is a vehicle panel to which a metal part is to be attached.

8. The rivet nut of claim 1 wherein there is a contact interface between the fastener and the plastic layer and at least one of the fastener or plastic layer has a texture to provide a mechanical link between the two members.

9. The rivet nut of claim 8 wherein the texture is selected from knurling, ribbing, patterned or raised areas at the interference area between the rivet nut and the plastic layer.

10. The rivet of claim 1 wherein the compression limiter includes an interference portion that contacts the plastic part for mechanically providing a predetermined interference fit with the plastic layer.

11. The rivet nut of claim 10 wherein the fastener includes a chamfered portion which contacts a portion of the opening through the plastic layer.

12. The rivet nut of claim 1 wherein the metal part is a hinge member, a ball member for a lift cylinder attachment, a lift strut attachment member or a portion of a latch.

13. A liftgate for a vehicle including a metal portion attached to a polymer based panel by way of a rivet nut fastener, said fastener comprising: a threaded attachment portion, a compression limiter portion which provides a spacer for protecting the integrity of a first polymer panel while spreading the load interface to the plastic panel and to the attached metal part component, a compression portion which provides full compressive attachment to the metal portion and a through fastener for securing the assembly together.

14. The rivet nut of claim 13 wherein the compression limiter is a collar.

15. The rivet nut of claim 13 where in the compression limiter is a sleeve.

16. The rivet nut of claim 13 wherein the compression limiter is integrated with the collar.

17. The rivet nut of claim 13 wherein the compression limiter has a radially extending circumferential head portion attached to a cylinder shaped body portion.

18. The rivet nut of claim 13 wherein the axial dimension of the compression limiter is about the thickness of a part layer.

19. The rivet nut of claim 18 wherein the part layer is a vehicle panel to which a metal part is to be attached.

20. The rivet nut of claim 13 wherein there is a contact interface between the fastener and the plastic layer and at least one of the fastener or plastic layer has a texture to provide a mechanical link between the two members.

21. The rivet nut of claim 20 wherein the texture is selected from knurling, ribbing, patterned or raised areas at the interference area between the rivet nut and the plastic layer.

22. The rivet of claim 13 wherein the compression limiter includes an interference portion that contacts the plastic part for mechanically providing a predetermined interference fit with the plastic layer.

23. The rivet nut of claim 22 where in wherein the fastener includes a chamfered portion which contacts a portion of the opening through the plastic layer.

24. The rivet nut of claim 13 wherein the metal part is a hinge member, a ball member for a lift cylinder attachment, a lift strut attachment member or a portion of a latch.

\* \* \* \* \*